US008451686B2

(12) United States Patent
Meunier

(10) Patent No.: US 8,451,686 B2
(45) Date of Patent: May 28, 2013

(54) PROCESS AND SYSTEM FOR THE ACQUISITION OF SEISMIC DATA

(75) Inventor: Julien Meunier, Paris (FR)

(73) Assignee: Cggveritas Services SA, Massy (FR)

( * ) Notice: Subject to any disclaimer, the term of this patent is extended or adjusted under 35 U.S.C. 154(b) by 1232 days.

(21) Appl. No.: 11/991,216

(22) PCT Filed: Aug. 25, 2006

(86) PCT No.: PCT/EP2006/065670
§ 371 (c)(1),
(2), (4) Date: Feb. 28, 2008

(87) PCT Pub. No.: WO2007/025933
PCT Pub. Date: Mar. 8, 2007

(65) Prior Publication Data
US 2009/0135671 A1    May 28, 2009

(30) Foreign Application Priority Data

Sep. 1, 2005   (FR) ...................................... 05 08965

(51) Int. Cl.
*G01V 1/00* (2006.01)
(52) U.S. Cl.
USPC .......................................................... 367/56
(58) Field of Classification Search
USPC .................................................. 367/140, 189
See application file for complete search history.

(56) References Cited

U.S. PATENT DOCUMENTS

| 3,733,584 | A | * | 5/1973 | Pelton et al. | ..................... 367/55 |
| 3,956,730 | A | * | 5/1976 | Barbier | ........................... 367/37 |
| 4,281,403 | A | * | 7/1981 | Siems et al. | ..................... 367/76 |
| 5,724,241 | A | | 3/1998 | Wood et al. | |
| 6,519,533 | B1 | * | 2/2003 | Jeffryes | .......................... 702/17 |
| 2006/0145853 | A1 | * | 7/2006 | Richards et al. | ........... 340/572.1 |
| 2008/0008040 | A1 | * | 1/2008 | Laycock | ........................ 367/76 |

FOREIGN PATENT DOCUMENTS

WO    WO2004/063771    7/2004

OTHER PUBLICATIONS

Wams et al., "Recent Developments in 3-D Acquisition Techniques Using Vibroseis in Oman", Leading Edge, Aug. 1998, vol. 17, No. 8, pp. 1053-1061, XP002385367.

* cited by examiner

*Primary Examiner* — Isam Alsomiri
*Assistant Examiner* — Krystine Breier
(74) *Attorney, Agent, or Firm* — Potomac Patent Group, PLLC

(57) ABSTRACT

The invention relates to a method for the acquisition of seismic data that uses sources operable to produce, when they are in a shooting station, seismic vibrations according to a sweep type shooting sequence, of predetermined duration and variable frequency. According to this method, the source and recording device clocks are synchronized, shooting is authorized for each of the sources at a series of predetermined shooting times tk,n, with k being an order number for a given source and n a source order number, between 1 and the number of sources Ns, and carried out on condition that the source is in a state to produce vibrations at such time tk,n, and the signals produced by the receivers are continuously recorded. The invention also relates to a system for seismic acquisition that implements this method.

20 Claims, 1 Drawing Sheet

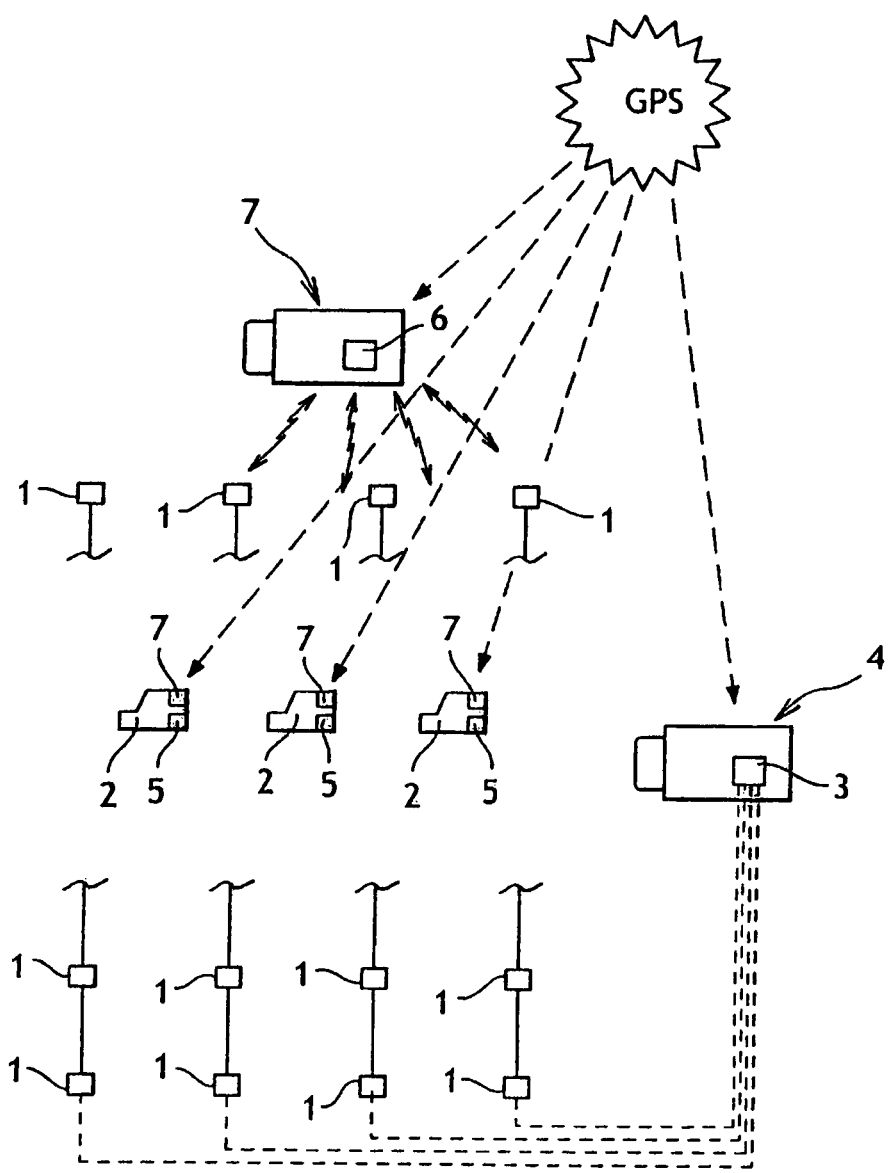

PROCESS AND SYSTEM FOR THE ACQUISITION OF SEISMIC DATA

CROSS-REFERENCE TO RELATED APPLICATION

This national phase application is based on PCT/EP2006/065670 filed on Aug. 25, 2006 which claims priority to French Application No. 0508965 filed Sep. 1, 2005 entitled "Process and System for the Acquisition of Seismic Data".

The present invention relates to a process for the acquisition of seismic data by means of sources producing seismic waves in a "sweep" type shooting sequence, of predetermined duration and variable frequency. The invention also relates to a system for the acquisition of seismic data that includes such sources.

In the oil and gas industry sector particularly, geophysical prospecting methods are commonly used in searching for and evaluating subterranean hydrocarbon deposits. In this respect, many systems are known for the acquisition of seismic data comprising a plurality of seismic receivers, such as geophones, placed in contact with the ground and arranged so as to cover an area of the subsurface to be explored and a plurality of vibration sources placed in the vicinity of the receivers and operable to generate vibrations which are reflected at the interfaces between geological strata. The vibration sources produce a seismic signal known as a "sweep", applied to the ground surface. This signal is a sinusoidal vibration lasting generally between 2 and 20 seconds, with its frequency typically increasing or diminishing in a continuous and monotone way over a given range of frequencies.

A series of sweeps produced by one or more sources at points very close to each other is called a vibrated point or VP. Generally speaking, a VP includes between 1 and 6 sweeps, uses from 1 to 5 vibrators, and covers a surface of less than 60×60 $m^2$.

The reflected seismic waves are converted into electrical signals by the receivers distributed over a distance of several kilometers and transmitted, either by electric cables, or by radio, to a central station, generally a laboratory-truck that includes recording means and means of processing said signals to form seismograms which will be used to generate the seismic image of the subsurface. The most common processing consists in correlating the recorded signals with the emitted sweep. This operation comes down to compressing this signal of a few seconds into a signal which is the shorter as the frequency range is broader.

One particular method of acquiring seismic data known as "slip-sweep" as described in the publication Wams, J. and Rozemond J. (1998), "Recent Developments in 3-D acquisition using vibroseis in Oman", *Leading Edge* 17 no. 8, pp 1053-1063 for example, has been perfected so as to increase the number of sweeps per time unit. This method allows vibrated points to be generated by multiple vibroseismic sources with a frequency the limit of which is equal to the inverse of the receiver listening time. The method consists in generating another sweep with another source before the end of the previous one. The gap between the successive generations of vibrations is called the "slip time" and must be at least equal to the time during which any potential reflections are listened to. The method is usually employed in the following way. In addition to the "slip time" and the number of independent sources, the maximum length of the "mother record" is defined as a function of the available memory in the recording system and of the recording parameters. When a source is ready to produce vibrations, it notifies the same to the central station by radio. The latter determines whether the source can be authorised to vibrate as a function of the start time of the last sweep generated, of the state of the other sources and of the time remaining before the end of a mother record. If need be, the central station transmits the shooting order by radio to the source and the sweep is generated at an exact known time on the internal clock of the source and the internal clock of the recording system. Knowledge of the shooting times allows recordings to be reset after correlation. The accuracy of this resetting depends on the accuracy of the source clocks and of the recording system as well as of the radio transmission system. It will be observed that, as the end of a "mother record" approaches, the recording means do not authorize any source to generate vibrations in order not to truncate a shot point. At the same time as the seismic signals transmitted by the receivers, or at the end of each sweep, the recording means receive, by radio, quality control information transmitted by each source such as the amplitude and phase of the force applied to the ground.

The method described above in relation to the slip-sweep technique has drawbacks. It causes time to be lost at the end of each shooting salvo. It requires the use of a frequency band for the transmission of the information from each vibration source, and reduces the number of sources which can be deployed simultaneously. It causes the recording to stop when a problem occurs in the transmission of information between the vibration sources and the recording means.

The invention is aimed at overcoming these drawbacks.

To this end, there is provided a method for the acquisition of seismic data relating to a subsurface area on the surface of which are deployed a plurality of seismic wave receivers in contact with the ground, a device for recording the signals produced by the receivers, and a plurality of vibration sources scheduled to follow respective predetermined paths each including a succession of shooting stations, said sources being operable to produce, when they are in a shooting station, seismic vibrations according to a sweep type shooting sequence, of a predetermined duration and variable frequency, comprising the steps of synchronising the clocks of the sources and recording device, authorizing each source to shoot at a respective series of predetermined shooting times $t_{k,n}$, with k being an order number for a given source and n a source order number, between 1 and the number of sources $N_s$, said authorizing step causing the source to produce seismic vibrations on the condition that at time $t_{k,n}$, the source is a state to produce vibrations, and continuously recording the signals produced by the receivers.

If a vibration source is not in a state to produce vibrations at a given shooting time of its series, for example because it has not yet reached a shooting station, it will generate vibrations only from the next shooting time, provided it has reached a shooting station and is in a state to produce vibrations by then.

The shooting times $t_{k,1}, \ldots t_{k,n}, \ldots t_{k,Ns}$ provided in respect of the different sources can be spaced out evenly. Alternatively, the shooting times $t_{k,1} \ldots t_{k,n} \ldots t_{k,Ns}$ can be spaced out in a pseudo-random sequence. Moreover, provision can be made to enable the series of shooting times to be modified during recording.

According to another aspect, there is provided according to the invention a system for the acquisition of seismic data that includes a plurality of seismic wave receivers adapted to be placed in contact with the ground, a device for recording the signals produced by the receivers, and a plurality of vibration sources scheduled to follow respective predetermined paths each including a succession of shooting stations, said sources being operable to produce, where they are in a shooting station, seismic vibrations in a sweep type shooting sequence, of predetermined duration and variable frequency, each source including a clock synchronisation means and means for delivering a series of shooting times $t_{k,n}$ with k being an order number and n the order number of the source under consideration, between 1 and the number of sources $N_s$, said source producing seismic vibrations from said shooting time $t_{k,n}$ on the condition that it is in a state to produce vibrations at time $t_{k,n}$.

Other advantages and characteristics will be clear from the following description, given with reference to the appended drawings in which:

FIG. 1 is a diagram showing a system for the acquisition of seismic data according to the invention.

With reference to FIG. 1, the system for the acquisition of data according to the invention comprises a network of receivers 1 placed over the area of the subsurface to be explored and in contact with the surface of the ground, a number $N_s$ of vibroseismic sources 2 placed in the vicinity of said receivers 1 and recording means 3 connected to the network of receivers 1 and placed in a station-truck 4. Each source 2 may be composed of a variable number of vibrators, typically between 1 and 5. Each source occupies during acquisition successive shooting stations and thus follows a pre-established path.

Each source 2 includes an autonomous recording device 5 in which is stored a series of shooting times $t_{k,n}$ defined from an origin time $T_0$, with n being an order number assigned to said source, between 1 and the number of sources $N_s$, and k taking the whole values 1, 2, etc up to the end of the acquisition. Alternatively, instead of being stored, shooting times $t_{k,n}$ can be generated in accordance with a predetermined algorithm by a computer provided in the recording device 5.

According to an embodiment, the series of k-order shooting times $t_{k,1}, \ldots, T_{k,n}, \ldots t_{k,Ns}$ of the respective sources is composed of evenly spaced times. Another possibility consists in spacing out the k-order shooting times $t_{k,1}, \ldots, T_{k,n}, \ldots t_{k,Ns}$ of the different sources unevenly, in accordance with a predetermined pseudorandom sequence.

Appropriately, the successive shooting times $t_{k,n}$ of a given source of order n are spaced out evenly, in accordance with the expression:

$$t_{k,n} = T_0 + (n + k \cdot N_s) IT$$

with n and k having the above definitions and IT being a predetermined period of time.

In the event that a source 2 of order n is not in a state to shoot at a given time $t_{k,n}$, for example because it has not reached its next shooting station, it will produce vibrations only from the next time $t_{k+1,n}$ of its shooting sequence (provided of course that it is in a state to shoot at that time).

Each source includes means to provide the characteristic data on each shot: spatial coordinates of the source and effective shooting start time, which data is recorded in the device 5 and will be used in combination with the seismic signals produced by the receivers 1 and recorded by the means 3 to produce seismograms. Each source also includes means to provide quality control information such as the amplitude and the phase of the force applied during shooting, also recorded in the device 5.

Each source also includes a means for synchronising its internal clock. This can be carried out by synchronisation against an external clock such as for example that of the GPS constellation, or by recording, in the recording device 5, a reference signal such as for example the time signal emitted by satellites of the GPS constellation.

The recording means 3 are able to record continuously the signals of the vibrations reflected by the subsurface area to be explored, as measured and transmitted by the vibration receivers 1. Said recording means 3 include, just like the sources 2, a synchronisation means allowing either their internal clock to be synchronised against an external clock such as for example that of the GPS constellation or the time signal transmitted by the satellites of the GPS constellation to be recorded. Additionally, it is appropriate to provide, in the station-truck 4, means to correlate the signals recorded continuously by the means 3 with the sweep signal of the sources in order to obtain the signals specific to each shot and to deduce therefrom in respect of each shot a shot start time and a shot position, which are recorded in the recording means 3.

Moreover, the system comprises acquisition management means 6 placed in a station-truck 7. Where necessary, the means 6 can be placed in the same station-truck as the one that receives the recording means 3.

The acquisition management means 6 are connected via a radio link to the sources 2 and can transmit to them a vibration production stop order. This radio link can also be used if it is wished to transmit to the acquisition management means 6, shortly after each shot, the characteristic data on the shots recorded in the devices 5 of the sources. The radio link is also used for the communications with the station-truck 4 carrying the recording means. The information relating to shooting times and positions, derived by correlating the received signals with the sweep applied to the sources, can thus be communicated to the management means 6 for comparison with the information communicated by the sources 2.

It will be noted that in the described embodiment, data transmission by radio link is minimal and does not play a critical role in the performance of the acquisition. One single sequence is sufficient to transmit the data between all the sources 2 and the acquisition management means 6, and the same frequency can be used for voice communications. This is a major advantage in terms of efficiency and operational reliability.

Additionally, given that source control is not centralised, the number of sources is not restricted. It Is thus possible to deploy a greater number of sources than in current conventional practice, for example 10 sources or more, with each source then comprised of a smaller number of vibrators, for example 1 or 2 vibrators.

The invention as illustrated by the above-described embodiment can be applied not only with the aforementioned slip-sweep technique, but more generally, in all cases of acquisition by means of vibroseismic sources.

It will be observed that, with the method according to the invention, there is no time lost at the end of each shooting salvo.

Moreover, the shooting parameters $T_0$, $N_s$ and IT can be modified during the acquisition of seismic data in accordance with the progress of the sources or external conditions. Each modification, communicated by radio from the management means to the sources 2, is recorded and dated.

The invention claimed is:

1. A method for the acquisition of seismic data relating to a subsurface area on the surface of which are deployed (1) a plurality of seismic wave receivers in contact with the ground, (2) a recording device for recording signals produced by plural receivers, and (3) a plurality of vibration sources scheduled to follow respective predetermined paths each including a succession of shooting positions, said sources being operable to produce, when they are in a shooting position, seismic vibrations according to a sweep type shooting sequence, of a predetermined duration and variable frequency, the method comprising the steps of:
- synchronizing clocks of the sources and the recording device;
- authorizing each source to shoot at a respective series of predetermined shooting times $t_{k,n}$, with k being an order number for a given source and n a source order number, between 1 and the number of sources $N_s$, said authorizing step causing the source to produce seismic vibrations on the condition that at said time $t_{k,n}$, the source is in a state to produce vibrations or otherwise, if the source is not in the state to produce vibrations, causing the source to produce the seismic vibrations at a next time $t_{k+1,n}$ of the respective series of predetermined shooting times; and
- continuously recording signals produced by the vibrations at the plural receivers,
- wherein said time $t_{k,n}$ is a function of an initial time $T_0$, the number of sources $N_s$, a predetermined time IT, the order number k and the source order number n.

2. A method according to claim 1, wherein the shooting times $t_{k,1}, \ldots, t_{k,n} \ldots t_{k,NS}$ provided in respect of the different sources are spaced out evenly.

3. A method according to claim 1, wherein said time $t_{k,n}$ is equal to $T_0+(n+k \cdot N_s) \cdot IT$.

4. A method according to claim 2, wherein the successive shooting times $t_{1,n \ldots k,n}$ provided for a source numbered n are evenly spaced out in time.

5. A method according to claim 2, wherein the intervals between said times can be modified in the course of acquisition.

6. A method according to claim 1, wherein the recording device and the vibration sources are synchronized by means of an external clock.

7. A method according to claim 1, wherein the recording device and the vibration sources are synchronized by means of one and the same radio signal.

8. A method according to claim 7, wherein the radio signal is provided by a terrestrial atomic clock.

9. A method according to claim 7, wherein the radio signal is provided by a GPS constellation clock.

10. A method according to claim 9, wherein the sweep start time and the coordinates of the source position are communicated from the sources to the recording device, at the end of each sweep.

11. A system for the acquisition of seismic data, the system comprising:
- a plurality of seismic receivers adapted to be placed in contact with the ground;
- a device for recording signals produced by the receivers; and
- a plurality of vibration sources scheduled to follow predetermined respective paths each path including a succession of shooting positions, said sources being operable to produce, when they are in a shooting position, seismic vibrations according to a sweep type shooting sequence of predetermined duration and variable frequency, each source including a clock synchronization means and means for delivering a series of shooting times $t_{k,n}$, with k being an order number and n the order number of the source under consideration, between 1 and the number of sources $N_s$, said source producing seismic vibrations at said shooting time $t_{k,n}$, on the condition that it is in a state to produce vibrations at time $t_{k,n}$, or otherwise, if the source is not in the state to produce vibrations, causing the source to produce the seismic vibrations at a next time $t_{k+1,n}$ of the series of shooting times,
- wherein said time $t_{k,n}$ is a function of an initial time $T_0$, the number of sources $N_s$ a predetermined time IT, the order number k and the source order number n.

12. The system of claim 11, wherein the shooting times $t_{k,1} \ldots, t_{k,n} \ldots t_{k,NS}$ provided in respect of the different sources are spaced out evenly.

13. The system of claim 11, wherein said time $t_{k,n}$ is equal to $T_0+(n+k \cdot N_s) \cdot IT$.

14. The system of claim 11, wherein the successive shooting times $t_{1,n \ldots k,n}$ provided for a source numbered n are evenly spaced out in time.

15. The system of claim 11, wherein the intervals between said times can be modified in the course of acquisition.

16. The system of claim 11, wherein the recording device and the vibration sources are synchronized by means of an external clock.

17. The system of claim 11, wherein a source further comprises:
- a recording device configured to store the series of shooting times $t_{k,n}$.

18. The system of claim 11, wherein a source further comprises:
- a recording device configured to locally generate the series of shooting times $t_{k,n}$.

19. The method of claim 1, further comprising:
- storing at the source the series of shooting times $t_{k,n}$, or
- generating locally at the source the series of shooting times $t_{k,n}$.

20. A method for the acquisition of seismic data relating to a subsurface area, the method comprising:
- synchronizing clocks of plural sources and a recording device associated with plural receivers;
- authorizing a source of the plural sources to shoot at a respective series of predetermined shooting times $t_{k,n}$, with k being an order number for a given source and n a source order number, between 1 and the number of sources $N_s$, said authorizing step causing the source to produce seismic vibrations on the condition that at said time $t_{k,n}$, the source is in a state to produce vibrations or otherwise, if the source is not in the state to produce vibrations, causing the source to produce the seismic vibrations at a next time $t_{k+1,n}$ of the respective series of predetermined shooting times; and
- recording signals produced by the vibrations at the plural receivers,
- wherein said time $t_{k,n}$ is a function of an initial time $T_0$, the number of sources $N_s$ a predetermined time IT, the order number k and the source order number n.

* * * * *

UNITED STATES PATENT AND TRADEMARK OFFICE
CERTIFICATE OF CORRECTION

PATENT NO. : 8,451,686 B2
APPLICATION NO. : 11/991216
DATED : May 28, 2013
INVENTOR(S) : Meunier It is certified that error appears in the above-identified patent and that said Letters Patent is hereby corrected as shown below:

On the Title Page, in Item (57), under "ABSTRACT", in Column 2, Line 8, delete "tk,n," and insert -- $t_{k,n}$, --, therefor.

On the Title Page, in Item (57), under "ABSTRACT", in Column 2, Line 10, delete "Ns," and insert -- $N_s$, --, therefor.

On the Title Page, in Item (57), under "ABSTRACT", in Column 2, Line 11, delete "tk,n," and insert -- $t_{k,n}$, --, therefor.

In the Specification

In Column 3, Line 36, delete "$T_{k,n}$," and insert -- $t_{k,n}$, --, therefor.

In Column 3, Line 39, delete "$T_{k,n}$," and insert -- $t_{k,n}$, --, therefor.

In Column 4, Line 41, delete "It Is" and insert -- It is --, therefor.

In the Claims

In Column 5, Line 11, in Claim 1, delete "$t_{kn}$," and insert -- $t_{k,n}$, --, therefor.

In Column 6, Line 49, in Claim 20, delete "$t_{kn}$," and insert -- $t_{k,n}$, --, therefor.

In Column 6, Line 57, in Claim 20, delete "$N_s$" and insert -- $N_s$, --, therefor.

Signed and Sealed this
Tenth Day of December, 2013

Margaret A. Focarino
*Commissioner for Patents of the United States Patent and Trademark Office*